United States Patent
Rogers et al.

(10) Patent No.: US 10,767,560 B2
(45) Date of Patent: Sep. 8, 2020

(54) BEARING COMPARTMENT OIL AUTO-IGNITION MITIGATION

(71) Applicant: United Technologies Corporation, Farmington, CT (US)

(72) Inventors: Daniel S. Rogers, Lyman, ME (US); Taryn Narrow, Glastonbury, CT (US); Gregory E. Reinhardt, South Glastonbury, CT (US); Collin P. Fitzgerald, South Glastonbury, CT (US); Christopher M. Valva, Manchester, CT (US); Leonard Kolshak, Lake Worth, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 30 days.

(21) Appl. No.: 16/127,365

(22) Filed: Sep. 11, 2018

(65) Prior Publication Data

US 2020/0080478 A1   Mar. 12, 2020

(51) Int. Cl.
*F02C 7/06* (2006.01)

(52) U.S. Cl.
CPC ............ *F02C 7/06* (2013.01); *F05D 2240/50* (2013.01); *F05D 2240/55* (2013.01);
(Continued)

(58) Field of Classification Search
CPC ........ F02C 7/06; F01D 25/183; F01D 25/162; F01D 25/125; F05D 2240/50;
(Continued)

(56) References Cited

U.S. PATENT DOCUMENTS

| | | |
|---|---|---|
| 4,645,415 A | 2/1987 | Hovan et al. |
| 4,709,545 A | 12/1987 | Stevens et al. |

(Continued)

FOREIGN PATENT DOCUMENTS

| | | |
|---|---|---|
| EP | 1307672 | 5/2003 |
| EP | 2657465 | 10/2013 |

(Continued)

OTHER PUBLICATIONS

European Search Report for European Patent Application No. 19196825.4 completed Jan. 14, 2020.

*Primary Examiner* — J. Todd Newton
*Assistant Examiner* — Sabbir Hasan
(74) *Attorney, Agent, or Firm* — Carlson, Gaskey & Olds, P.C.

(57) ABSTRACT

A bearing assembly for a gas turbine engine includes, among other things, a bearing housing extending along an axis to define a bearing compartment, a lubricant seal assembly adjacent to the bearing housing to bound the bearing compartment, an air seal assembly defining a vent cavity along the bearing housing, wherein a mixing cavity is defined between the lubricant seal assembly and the air seal assembly, and wherein the bearing housing defines an airflow supply passage, an airflow vent passage and a scupper passage having respective fluid ports at different circumferential positions relative to the axis, the fluid port of the airflow vent passage fluidly coupled to the vent cavity, and the fluid ports of the airflow supply and scupper passages fluidly coupled to the mixing cavity. A method of sealing for a gas turbine engine is also disclosed.

15 Claims, 6 Drawing Sheets

(52) U.S. Cl.
CPC ...... *F05D 2260/98* (2013.01); *F16N 2210/02* (2013.01); *F16N 2210/08* (2013.01); *F16N 2210/14* (2013.01)

(58) Field of Classification Search
CPC ............. F05D 2240/55; F05D 2260/98; F16N 2210/02; F16N 2210/08; F16N 2210/14
See application file for complete search history.

(56) References Cited

U.S. PATENT DOCUMENTS

| | | | |
|---|---|---|---|
| 5,415,478 | A | 5/1995 | Matthew et al. |
| 6,330,790 | B1 * | 12/2001 | Arora ...................... F01D 11/04 |
| | | | 277/303 |
| 7,093,418 | B2 | 8/2006 | Morris et al. |
| 7,430,850 | B2 | 10/2008 | Peters et al. |
| 8,371,127 | B2 | 2/2013 | Durocher et al. |
| 9,316,118 | B2 | 4/2016 | Alvarez et al. |
| 9,567,908 | B2 * | 2/2017 | Bordne ...................... F02C 7/06 |
| 9,903,224 | B2 * | 2/2018 | Scott ....................... F01D 9/065 |
| 2005/0235651 | A1 | 10/2005 | Morris et al. |
| 2017/0107854 | A1 | 4/2017 | Friedl |

FOREIGN PATENT DOCUMENTS

| | | |
|---|---|---|
| EP | 3112729 | 1/2017 |
| GB | 2081819 | 2/1982 |

* cited by examiner

BEARING COMPARTMENT OIL AUTO-IGNITION MITIGATION

STATEMENT REGARDING FEDERALLY SPONSORED RESEARCH OR DEVELOPMENT

This invention was made with government support under Contract No. FA8650-09-D-2923-0021, awarded by the United States Air Force. The Government has certain rights in this invention.

BACKGROUND

This application relates to sealing for a gas turbine engine, including bearing arrangements that establish flow paths to capture lubricant conveyed from bearing compartments.

Gas turbine engines are known, and typically include a fan delivering air into a low pressure compressor section. The air is compressed in the low pressure compressor section, and passed into a high pressure compressor section. From the high pressure compressor section the air is introduced into a combustor section where it is mixed with fuel and ignited. Products of this combustion pass downstream over a high pressure turbine section, and then a low pressure turbine section to extract energy for driving the fan.

Bearing compartments typically receive fluid for cooling and lubricating one or more bearings. The bearing compartment may include seals that fluidly separate the bearing compartment from adjacent cavities. Airflow in the adjacent cavities may be at elevated temperatures relative to lubricant in the bearing compartment.

SUMMARY

A bearing assembly for a gas turbine engine according to an example of the present disclosure includes a bearing housing extending along an axis to define a bearing compartment, a lubricant seal assembly adjacent to the bearing housing to bound the bearing compartment, an air seal assembly defining a vent cavity along the bearing housing, wherein a mixing cavity is defined between the lubricant seal assembly and the air seal assembly, and wherein the bearing housing defines an airflow supply passage, an airflow vent passage and a scupper passage having respective fluid ports at different circumferential positions relative to the axis, the fluid port of the airflow vent passage fluidly coupled to the vent cavity, and the fluid ports of the airflow supply and scupper passages fluidly coupled to the mixing cavity.

In a further embodiment of any of the foregoing embodiments, the airflow supply passage is fluidly coupled to an airflow source that supplies airflow at a relatively lower temperature than airflow in the vent cavity.

In a further embodiment of any of the foregoing embodiments, the airflow supply passage includes an inlet port fluidly coupled to the airflow source, the fluid port of the airflow supply passage includes first and second outlet ports at different circumferential positions relative to the axis, and the airflow supply passage branches from the inlet port to the first and second outlet ports.

In a further embodiment of any of the foregoing embodiments, the airflow supply passage includes a first airflow supply passage and a second airflow supply passage, the respective fluid ports of the first and second airflow supply passages on opposed sides of the bearing housing with respect to a reference plane, the reference plane extending between the fluid port of the airflow vent passage and the fluid port of the scupper passage to define the opposed sides.

In a further embodiment of any of the foregoing embodiments, the fluid port of the scupper passage is defined at a bottom dead center position.

In a further embodiment of any of the foregoing embodiments, the fluid port of the airflow vent passage is defined at a top dead center position.

In a further embodiment of any of the foregoing embodiments, the scupper passage is fluidly coupled to a drain path that terminates at a lubricant collection area.

In a further embodiment of any of the foregoing embodiments, the air seal assembly includes first and second seals, the vent cavity extends between the first and second seals, and the first seal bounds the mixing cavity.

In a further embodiment of any of the foregoing embodiments, the first and second seals are knife edge seals that establish a sealing relationship with seal lands defined along an inner diameter of the bearing housing.

A gas turbine engine according to an example of the present disclosure includes a fan section including a plurality of fan blades, a compressor section, a turbine section driving the fan section or the compressor section through a rotatable shaft that extends along an engine longitudinal axis, and a bearing assembly. The bearing assembly includes a bearing housing extending along the engine longitudinal axis to define a bearing compartment, a bearing in the bearing compartment that supports the shaft, a lubricant seal assembly adjacent to the bearing housing to bound the bearing compartment along the shaft, an air seal assembly defining a vent cavity along the bearing housing, wherein a mixing cavity is defined between the lubricant seal assembly and the air seal assembly, and wherein the bearing housing defines an airflow supply passage, an airflow vent passage and a scupper passage having respective fluid ports at different circumferential positions relative to the engine longitudinal axis, the fluid port of the airflow vent passage is fluidly coupled to the vent cavity, and the fluid ports of the airflow supply and the scupper passages are fluidly coupled to the mixing cavity.

In a further embodiment of any of the foregoing embodiments, the air seal assembly bounds a plenum axially aft of the mixing cavity with respect to the engine longitudinal axis, and a wall of the bearing housing defines the plenum.

In a further embodiment of any of the foregoing embodiments, the plenum is defined by a compressor rotor of the compressor section.

In a further embodiment of any of the foregoing embodiments, wherein the airflow supply passage is fluidly coupled to an airflow source that supplies airflow at a relatively lower temperature than airflow in the plenum.

In a further embodiment of any of the foregoing embodiments, the airflow supply passage includes a first airflow supply passage and a second airflow supply passage spaced apart by the vent and scupper passages, the fluid ports are defined along an inner diameter of the bearing housing, the fluid port of the scupper passage is defined at a bottom dead center position, and the fluid port of the vent passage is defined at a top dead center position.

In a further embodiment of any of the foregoing embodiments, a seal runner is mechanically attached to the rotatable shaft, wherein the seal runner establishes a sealing relationship with the lubricant seal assembly, and the air seal assembly includes first and second knife edge seals that extend outwardly from the seal runner to establish a sealing relationship with the inner diameter of the bearing housing.

A method of sealing for a gas turbine engine according to an example of the present disclosure includes establishing a first sealing relationship between a bearing compartment and a mixing cavity, wherein the mixing cavity is defined by a bearing housing that bounds the bearing compartment, and the bearing housing defines an airflow supply passage, an airflow vent passage and a scupper passage having respective fluid ports at different circumferential positions, establishing a second sealing relationship along the bearing housing between the mixing cavity and a plenum, communicating airflow from the airflow supply passage to the mixing cavity such that a temperature of airflow communicated from the plenum to the mixing cavity is reduced, and communicating lubricant to the scupper passage in response to the lubricant being communicated from the bearing compartment to the mixing cavity.

In a further embodiment of any of the foregoing embodiments, the bearing compartment includes a bearing that supports a rotatable shaft mechanically attached to a compressor rotor, and the plenum is defined between a wall of the bearing housing and the compressor rotor.

In a further embodiment of any of the foregoing embodiments, the method includes establishing a third sealing relationship along the bearing housing between the mixing cavity and the plenum, and communicating airflow from a vent cavity to the airflow vent passage, the vent cavity interconnecting the mixing cavity and the plenum, the airflow in the mixing cavity being at a relatively lesser temperature than the airflow in the vent cavity.

In a further embodiment of any of the foregoing embodiments, the method includes communicating the lubricant from the scupper passage to a drain path that terminates at a lubricant collection area.

In a further embodiment of any of the foregoing embodiments, the step of communicating the airflow from the airflow supply passage to the mixing cavity includes dividing the airflow between at least two of the fluid ports.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
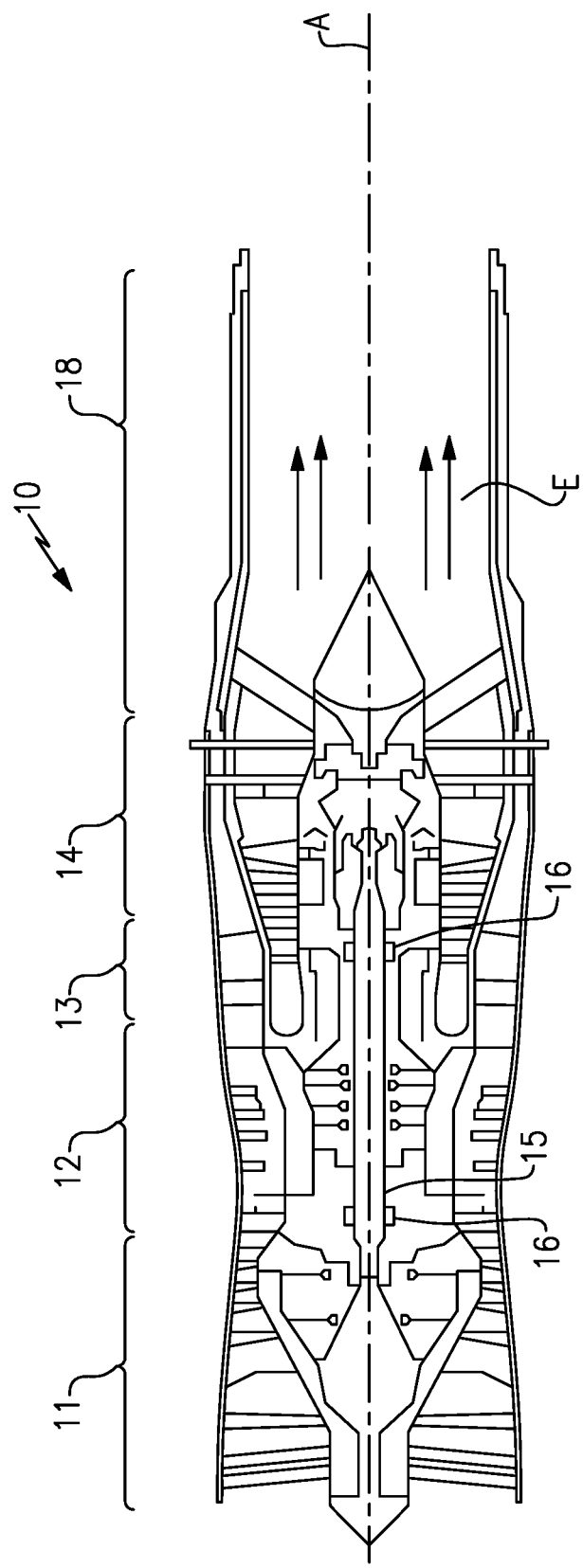
FIG. 1 illustrates a gas turbine engine.

Referring to FIG. 1, a gas turbine engine 10 includes a fan section 11, a compressor section 12, a combustor section 13, and a turbine section 14. A shaft 15 interconnects the turbine section 14 with the fan section 11 and the compressor section 12. The shaft 15 rotates about engine central longitudinal axis A and is supported by one or more bearing systems 16.

Air entering into the fan section 11 is initially compressed and fed to the compressor section 12. In the compressor section 12, the incoming air from the fan section 11 is further compressed and communicated to the combustor section 13. In the combustor section 13, the compressed air is mixed with gas and ignited to generate a hot exhaust stream E. The hot exhaust stream E is expanded through the turbine section 14 to drive the fan section 11 and the compressor section 12. The exhaust gasses E flow from the turbine section 14 through an exhaust liner assembly 18.

Figure 2:
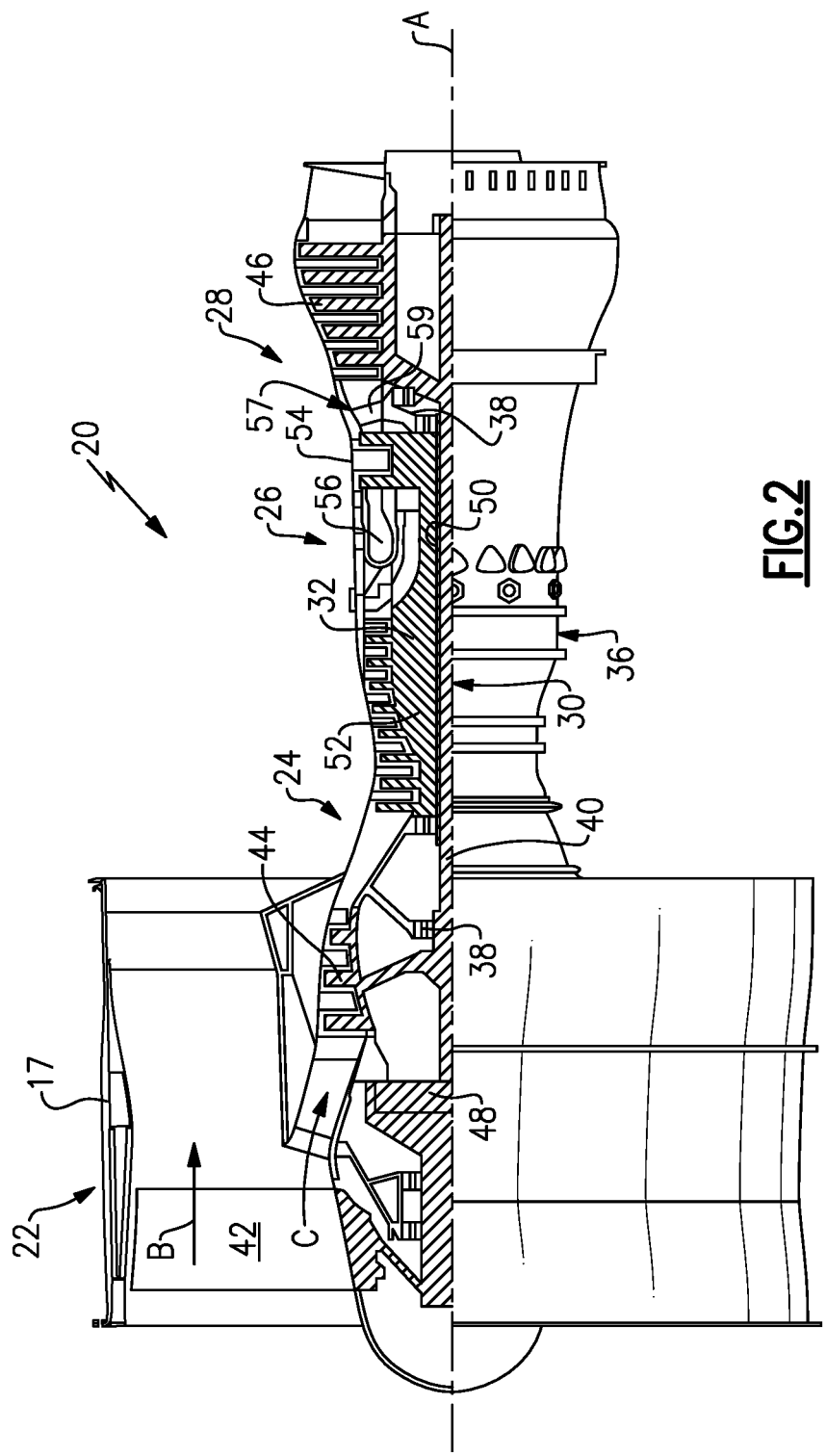
FIG. 2 illustrates a gas turbine engine according to another example.

FIG. 2 schematically illustrates a gas turbine engine 20 according to another example. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 17, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 3:
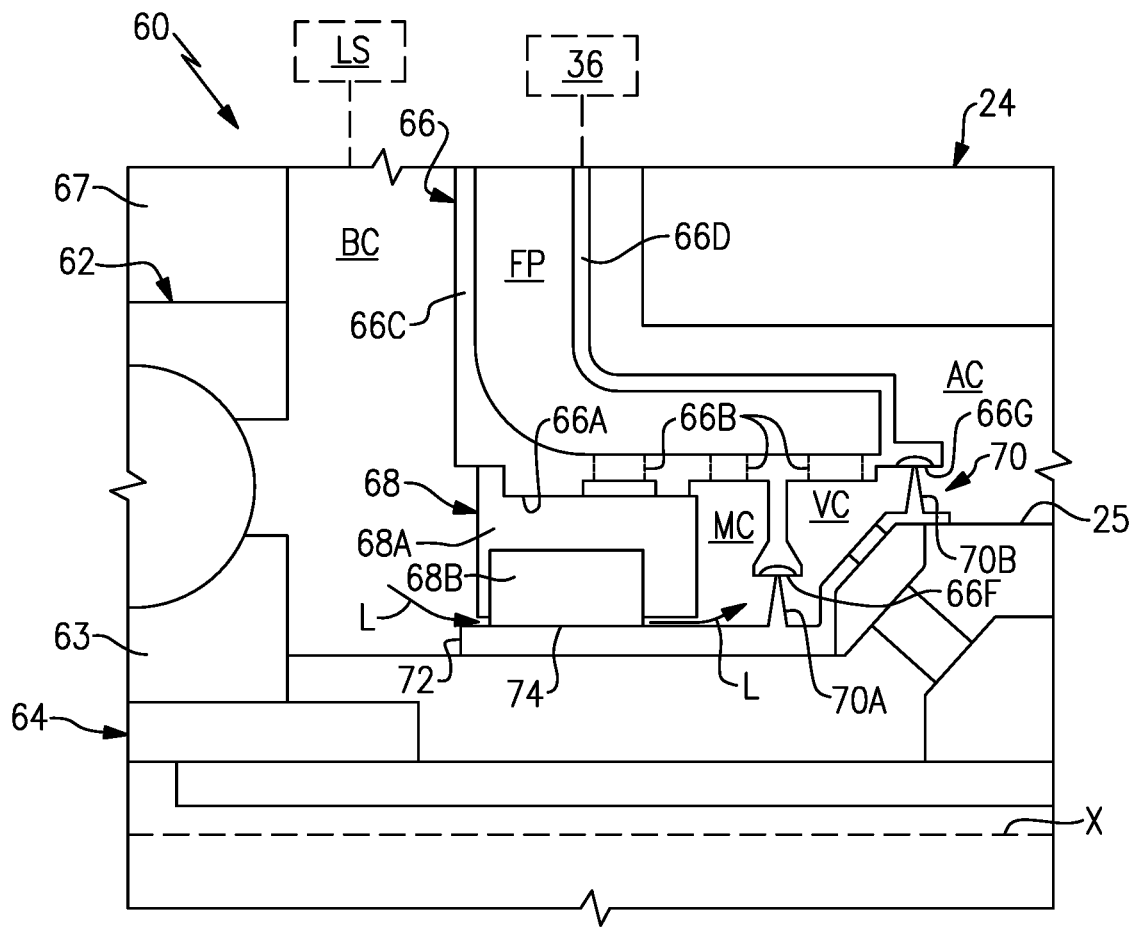
FIG. 3 illustrates a bearing assembly.

FIG. 3 illustrates a bearing assembly 60 according to an example. The bearing assembly 60 can be incorporated into the compressor sections 12, 24 or turbine sections 14, 28 of the gas turbine engines 10, 20, such as one of the bearing systems 16, 38, for example. Other components of the engines 10, 20 and other systems may benefit from the teachings herein, such as a towershaft coupled to one of the shafts 15, 40, 50 for starting the engine or driving an auxiliary power unit, fluid paths established between rotating and static components, and bearing arrangements within industrial land-based turbines.

The bearing assembly 60 includes one or more bearings 62 (one shown for illustrative purposes) situated in a bearing compartment BC. The bearing 62 can include one or more components such as a bearing carrier 63 including rotatable and static portions for supporting rotatable components of the bearing 62. In the illustrated example, the bearing 62 is a ball bearing. Other example bearings can include roller bearings and taper bearings. The bearing compartment BC is an oil wetted environment that fluidly communicates with a lubricant source LS (shown in dashed lines) to deliver a lubricant such as oil to the bearing 62. The lubricant source LS can be an oil tank coupled to the engine or aircraft, for example.

The bearing 62 supports a rotatable shaft 64 that is situated along a longitudinal axis X. The shaft 64 can be the shaft 16 of FIG. 1, or one of the shafts 40, 50 of FIG. 2, for example. The shaft 64 can include one or more portions mechanically attached to each other for rotation about the longitudinal axis X. The longitudinal axis X can be co-axial with the engine central longitudinal axis A (FIGS. 1 and 2).

The bearing assembly 60 disclosed herein can reduce a likelihood of a lubricant such as oil flowing from the bearing compartment BC into adjacent portions of the engine that may be at temperatures exceeding an auto-ignition temperature threshold of the lubricant. Auto-ignition can occur to due to oil contacting airflow that is above the auto-ignition temperature threshold, causing the lubricant to ignite.

The bearing assembly 60 includes a bearing housing 66 mechanically attached or otherwise secured to engine static structure 36 (shown in dashed lines for illustrative purposes). The bearing housing 66 extends along the axis X to bound or otherwise define at least a portion of the bearing compartment BC. It should be appreciated that the bearing compartment BC can be defined by other portions of the engine static structure 36, such as housing 67.

The bearing assembly 60 includes a lubricant seal assembly 68 and an air seal assembly 70 to establish sealing relationships adjacent the bearing compartment BC. The lubricant seal assembly 68 is arranged to establish a sealing relationship that is sequential with a sealing relationship established by air seal assembly 70.

In the illustrated example of FIG. 3, the lubricant seal assembly 68 extends from or is otherwise adjacent to the bearing housing 66 to bound or otherwise define a perimeter of the bearing compartment BC along the shaft 64. The lubricant seal assembly 68 includes a seal carrier 68A and at least one seal 68B (one shown for illustrative purposes). The seal carrier 68A is mechanically attached or otherwise secured to an inner diameter 66A of the bearing housing 66. In other examples, the seal carrier 68A is mechanically attached or otherwise secured at another location of the bearing housing 66, to another portion of the engine static structure 36, or to a rotating portion supported by the shaft 64. The seal 68B can be one or more carbon seals moveable in a radial direction to float with an adjacent seal land, for example. In other examples, the lubricant seal assembly 68 includes an axial carbon seal that seals against a radially extending seal land.

A seal runner 72 is mechanically attached or otherwise secured to the shaft 64. The seal runner 72 establishes a sealing relationship with the seal 68B of the lubricant seal assembly 68 to minimize or otherwise reduce flow of a lubricant L such as oil from the bearing compartment BC through an interface 74 between the seal 68B and seal runner 72 and to another portion of the engine that may be operating at a relatively greater temperature than the lubricant L, including temperatures or conditions that may exceed an auto-ignition threshold temperature of the lubricant.

The air seal assembly 70 can be configured to fluidly separate the bearing compartment BC from an adjacent plenum or airflow compartment AC. The airflow compartment AC can have relatively hot, pressurized air during engine operation due to close proximity to the core flow path of the engine. In the illustrated example of FIG. 3, the airflow compartment AC is defined by a compressor rotor 25 mechanically attached to the shaft 64. The air seal assembly 70 bounds the airflow compartment AC. The airflow compartment AC is defined between a wall of the bearing housing 66 and the compressor rotor 25. The compressor rotor 25 can be incorporated into the compressor section 12 of FIG. 1 or one of the compressors 44, 52 of the compressor section 24, for example. The pressurized airflow can be bleed air from the core flow path C of the compressor section 24, for example.

The lubricant seal assembly 68 and air seal assembly 70 are arranged to contain or otherwise oppose migration of lubricant L from the bearing compartment BC to the airflow compartment AC, thereby reducing a likelihood of degradation of components of the engine 20 or auto-ignition of the lubricant L in relative high temperature locations such the compressor sections 12, 24 or turbine sections 14, 28 of FIGS. 1 and 2.

The air seal assembly 70 defines a vent cavity VC along the bearing housing 66. A mixing cavity MC is defined axially between the lubricant seal assembly 68 and the air seal assembly 70. The vent cavity VC and mixing cavity MC are annular cavities that extend radially between the inner diameter 66A of the bearing housing 66 and an outer diameter of the shaft 64 or compressor rotor 25. In the illustrated example of FIG. 3, the vent cavity VC and mixing cavity MC are bounded by an outer diameter of the seal runner 72. The bearing compartment BC, mixing cavity MC and vent cavity VC are defined in series such that the vent cavity VC fluidly interconnects the mixing cavity MC and the airflow compartment AC, with the airflow compartment AC being axially aft of the mixing cavity MC with respect to the axis X.

The vent cavity VC extends axially between first and second seals 70A, 70B of the air seal assembly 70. The first seal 70A bounds the mixing cavity MC. The second seal 70B bounds the airflow compartment AC. The air seal assembly 70 is a labyrinth seal arrangement, with the first and second seals 70A, 70B being knife edge seals that extend outwardly from the seal runner 72. In some examples, the first and second seals 70A, 70B are integral with the seal runner 72. In other examples, the first and second seals 70A, 70B are integral with the shaft 64 or compressor rotor 25. The seals 70A, 70B each establish a sealing relationship with respective seal lands 66F, 66G extending inwardly from or otherwise defined along the inner diameter 66A of the bearing housing 66. In alternative examples, the seals 70A, 70B extend from the bearing housing 66 to establish a sealing relationship with seal lands along the seal runner 72. The seals 70A, 70B can also be arranged at different orientations than disclosed in FIG. 3 to establish sealing relationships adjacent to the mixing cavity MC. Although the air seal assembly 70 of FIG. 3 includes knife edge seals, other air seals can be utilized such as brush seals. Although the air seal assembly 70 is disclosed having two seals, it should be understood that the air seal assembly 70 can have fewer than two seals or more than two seals to reduce leakage of airflow across each stage.

The bearing housing 66 defines fluid passages FP (one shown in FIG. 3) between opposed walls 66C, 66D of the bearing housing 66. Wall 66C defines the bearing compartment BC, and wall 66D defines the airflow compartment AC. The bearing housing 66 includes a plurality (or first set) of fluid ports 66B (shown in dashed lines). Each fluid passage FP is fluidly coupled to one or more of the fluid ports 66B for communicating fluid between the fluid passages FP and the lubricant seal assembly 68, vent cavity VC and/or mixing cavity MC.

In the illustrated example of FIG. 3, the fluid passages FP has a generally L-shaped geometry including an axially extending portion connected to a radially extending portion with respect to the axis X. In other examples, the fluid passages FP has a generally straight profile that can extend in a radial direction relative to the axis X. Each fluid passage FP can have the same or a different geometry.

Figure 4:
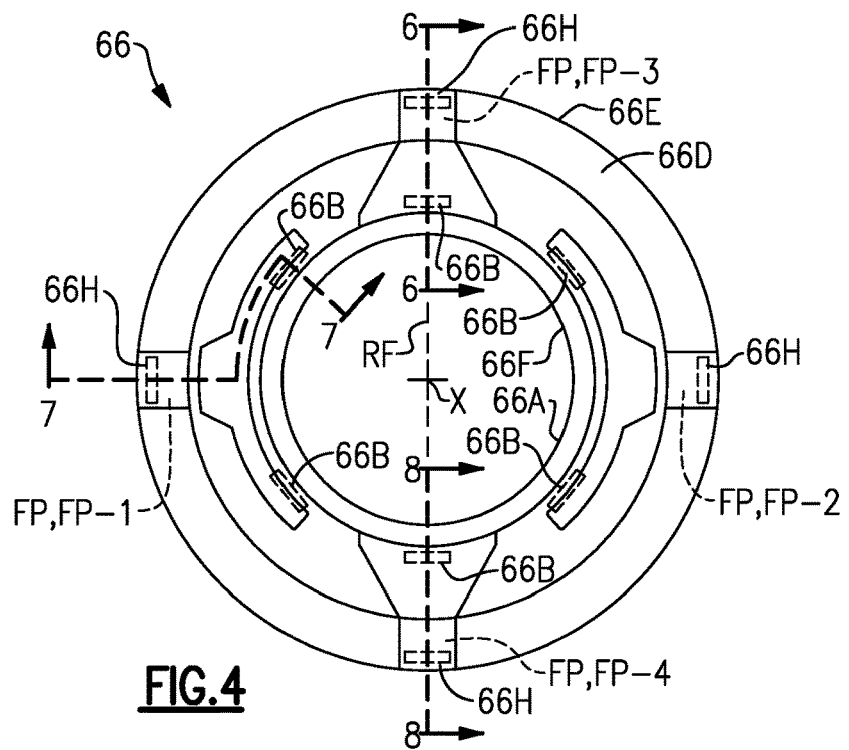
FIG. 4 illustrates an axial view of a bearing housing.
Figure 5:
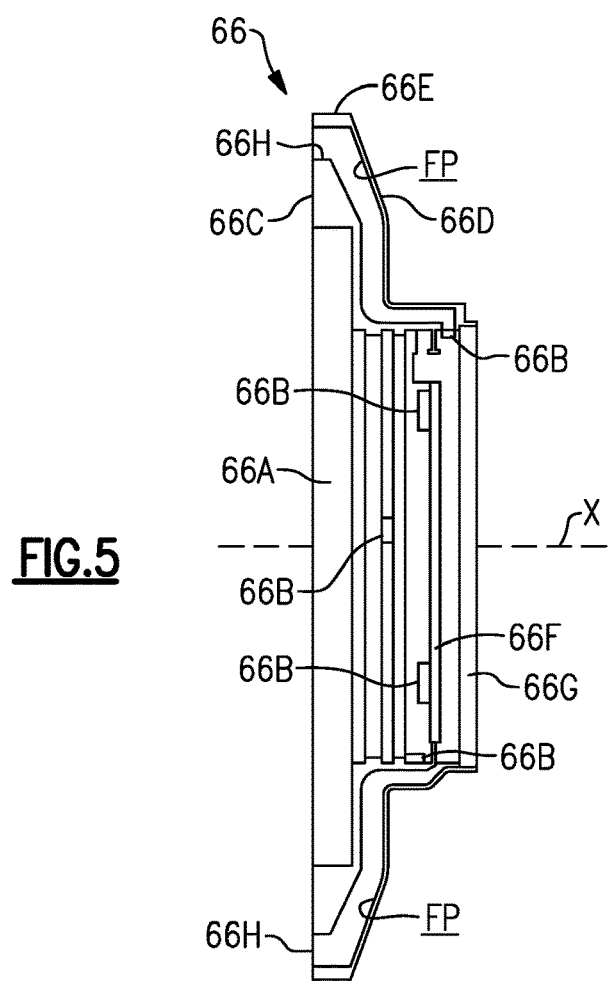
FIG. 5 illustrates a sectional view of the bearing housing of FIG. 4.

FIGS. 4 and 5, with continued reference to FIG. 3, the bearing housing 66 extends radially between the inner diameter 66A and an outer diameter 66E. The fluid ports 66B are defined at different circumferential and/or axial positions relative to the axis X. At least some of the fluid ports 66B can be at least partially axially aligned relative axis X. The bearing housing 66 defines a second set of fluid ports 66H. Each fluid passages FP interconnects one or more of the fluid ports 66B and one or more of the fluid ports 66H to establish a discrete flow path.

The bearing housing 66 can have a unitary construction, or can have one or more portions mechanically fastened together. Various techniques can be utilized to form the fluid passages FP and fluid ports 66B, 66H, including machining and casting processes.

In the illustrated example of FIG. 4, the bearing housing 66 defines four fluid passages FP. However, the bearing housing 66 can define fewer or more than four fluid passages FP. The fluid passages FP include first and second airflow supply passages FP-1, FP2, airflow vent passage FP-3 and scupper (or drain) passage FP-4 having respective fluid ports 66B at different circumferential positions relative to the axis X. The passages FP-1 to FP-4 are separate and distinct passages that extend radially outward from the inner diameter 66A of the bearing housing 66.

The airflow supply passages FP-1, FP2 are spaced apart by the vent and scupper passages FP-3 and FP-4. In the illustrated example of FIG. 4, the respective fluid ports 66B of the first and second airflow supply passages FP-1, FP2 are defined on opposed sides of the bearing housing 66 with respect to a reference plane RF. The reference plane RF extends between the fluid port 66B of the airflow vent passage FP-3 and the fluid port 66B of the scupper passage FP-4 to define the opposed sides. The reference plane RF can extend through the axis X to bisect the bearing housing 66.

Figure 6:
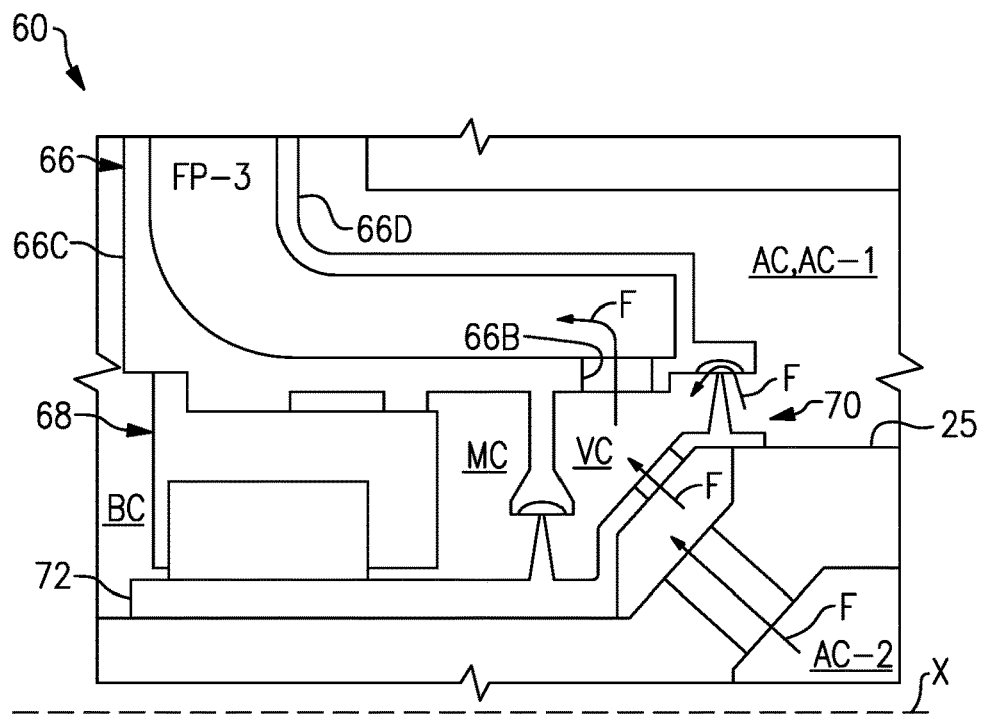
FIG. 6 illustrates a sectional view of the bearing assembly of FIG. 3 at a first circumferential position.
Figure 7:
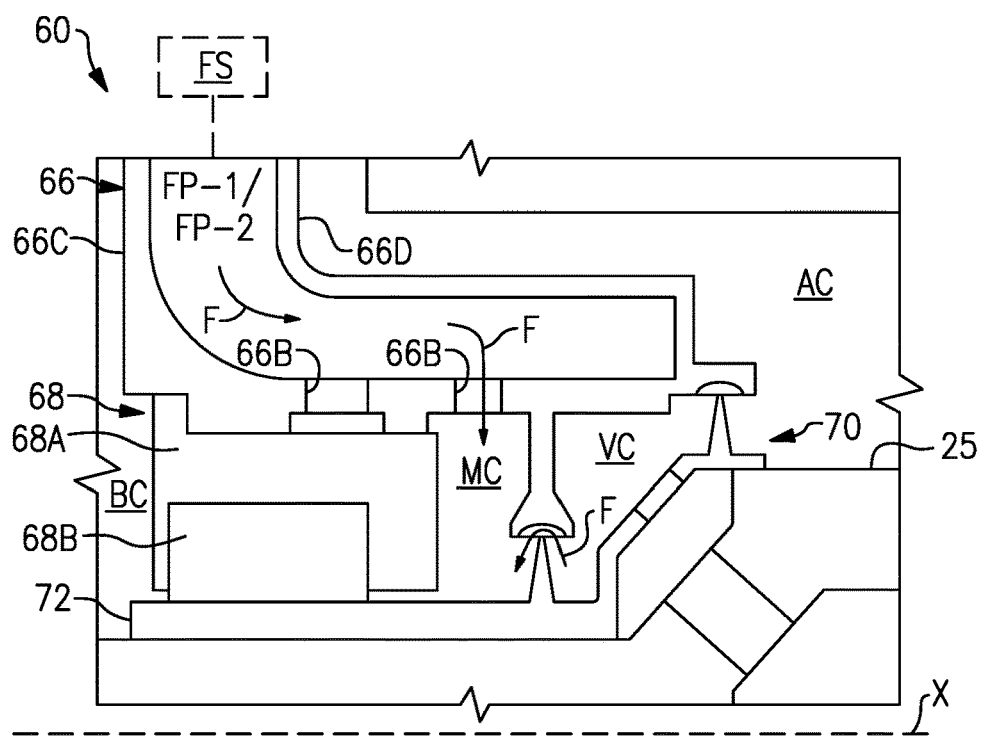
FIG. 7 illustrates a sectional view of the bearing assembly of FIG. 3 at a second circumferential position.
Figure 8:
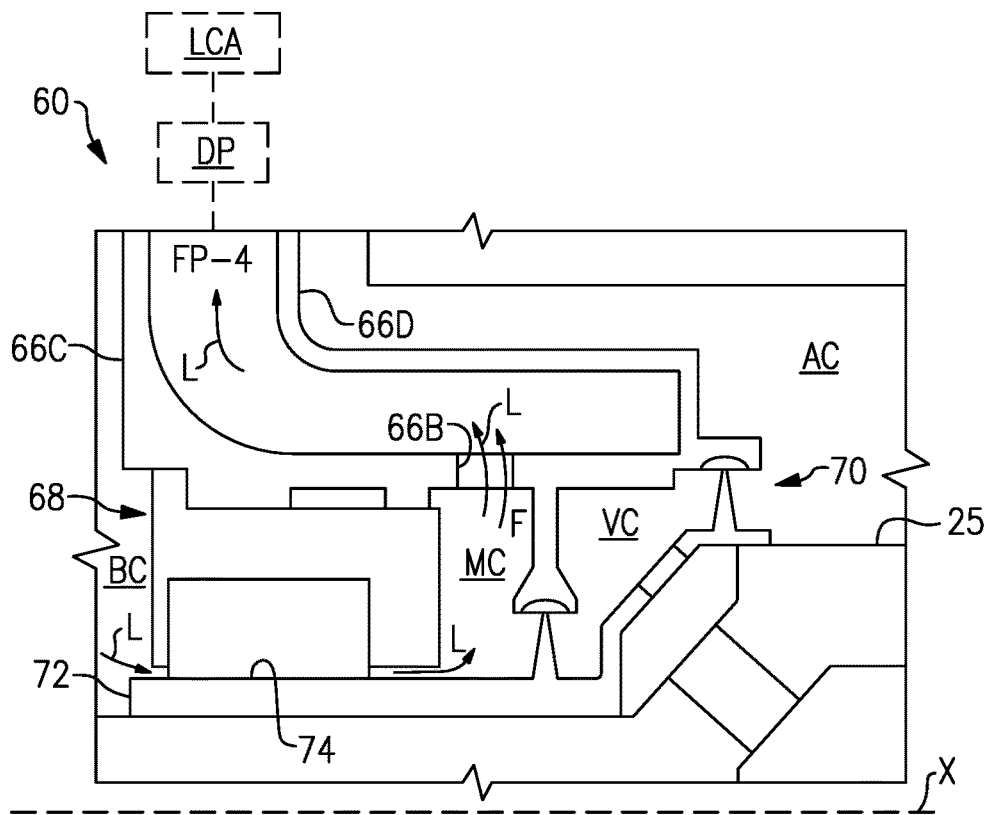
FIG. 8 illustrates a sectional view of the bearing assembly of FIG. 3 at a third circumferential position.

FIGS. 6-8 illustrate the bearing assembly 60 at different circumferential positions relative to the axis X. Referring to FIG. 6, fluid port 66B of the airflow vent passage FP-3 is fluidly coupled to the vent cavity VC. The fluid port 66B of the airflow vent passage FP-3 can be defined at a top dead center (TDC) position of the bearing housing 66, which is opposed to a bottom dead center (BDC) position. For the purposes of this disclosure, the "top dead center" and "bottom dead center" positions are defined with respect to an assembled position of the bearing assembly 60 in the engine.

During operation, pressurized airflow F is communicated from one or more regions of the airflow compartment AC (e.g., AC-1) to pressurize the air seal assembly 70 including the vent cavity VC. Pressurized airflow F can be communicated from other regions of the airflow compartment AC, such as region AC-2 which may be referred to as a "bore basket", and/or other portions of the engine and to the vent cavity VC. The airflow F and surfaces bounding the airflow compartment AC can be at relatively hot temperatures, including temperatures or conditions that may exceed an auto-ignition threshold temperature of lubricant in the bearing compartment BC.

The vent cavity VC is configured to trap the relatively hot airflow F and provides a path to vent or otherwise direct the hot airflow F away from the lubricant seal assembly 68, mixing cavity MC and bearing compartment BC. The airflow F is communicated from the vent cavity VC to the respective fluid port(s) 66B, and then to the airflow vent passage FP-3 to vent the pressurized airflow F to a downstream location, such as the core flow path or a portion of one of the turbine sections 14, 28 of FIGS. 1 and 2.

Referring to FIG. 7, one of the fluid ports 66B of the airflow supply passage FP-1/FP-2 can be fluidly coupled to the lubricant seal assembly 68 to pressurize the seal 68B. Another fluid port 66B of the airflow supply passage FP-1/FP-2 is fluidly coupled to the mixing cavity MC. Fluid port(s) 66H (FIG. 3) of the respective airflow supply passage FP-1/FP-2 serves as an inlet port and is fluidly coupled to a fluid or airflow source FS (shown in dashed lines). The airflow source FS supplies pressurized airflow F at a relatively lower temperature than pressurized airflow F in the vent cavity VC and/or airflow compartment AC to cool the mixing cavity MC. The airflow source FS can be an upstream portion of the engine, such as an upstream stage of one of the compressor sections 12, 24, for example, that provides buffer cooling airflow.

During operation, pressurized airflow F is communicated from the airflow supply passage FP-1/FP-2 to the mixing cavity MC. Any relatively hot airflow F that leaks past the air seal assembly 70 or that is otherwise communicated from the vent cavity VC is mixed in the mixing cavity MC together with the relatively cool buffer airflow F conveyed by the passage FP-1/FP-2. The mixed airflow F in the mixing cavity MC and surfaces bounding the mixing cavity MC can achieve a relatively lesser temperature than the pressurized airflow F in the vent cavity VC and/or the airflow compartment AC. The mixing causes a temperature of the mixed airflow F in the mixing cavity MC to be reduced. The mixing can cause a bulk average temperature of fluid in the mixing cavity MC to be maintained below an auto-ignition threshold temperature of lubricant L in the bearing compartment BC conveyed to the mixing cavity MC, thereby reducing a likelihood of fire due to ignition of the lubricant L.

Figure 9:
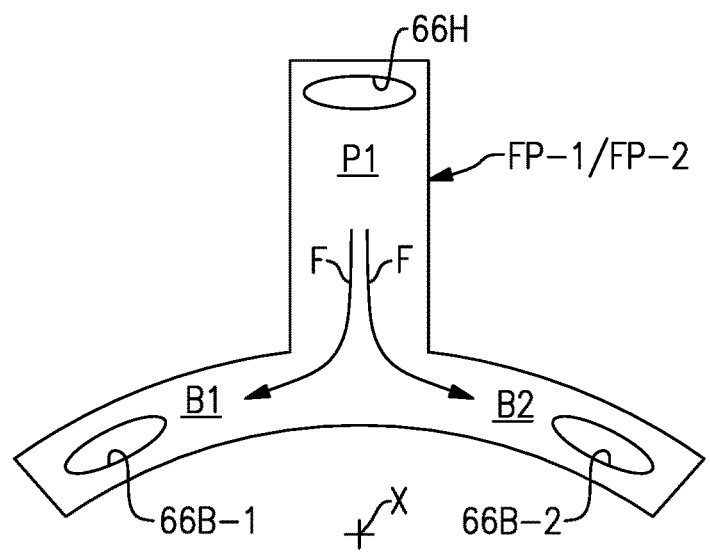
FIG. 9 illustrates a fluid passage defined by the bearing housing of FIG. 4.

Referring to FIG. 9, with continued reference to FIGS. 4 and 7, airflow supply passage FP-1/FP-2 is shown according to an example. Each airflow supply passage FP-1/FP-2 includes a plurality of fluid ports 66B. The fluid ports 66B include first and second outlet ports 66B-1, 66B-2 at different circumferential positions relative to the axis X. The first and second outlet ports 66B-1, 66B-2 of each airflow supply passage FP-1/FP-2 can be at least partially axially aligned relative to the axis X to establish flow communication with the mixing cavity MC (FIG. 7).

The airflow supply passage FP-1/FP-2 includes a first segment P1 fluidly coupled to the fluid port 66H that serves as an inlet port. The first segment P1 branches between two branch segments B1, B2 fluidly coupled to the first and second outlet ports 66B-1, 66B-2 to divide pressurized airflow F conveyed from the airflow source FS (FIG. 7). The first and second outlet ports 66B-1, 66B-2 convey the airflow F from the branch segments B1, B2 at different circumferential positions to more evenly spread or distribute the airflow F around the inner diameter 66A of the bearing housing 66. The airflow supply passages FP-1/FP-2 convey cooling airflow F in all four quadrants of the mixing chamber MC, which can reduce temperature gradients and stress concentrators in adjacent portions of the bearing assembly 60. Each airflow supply passage FP-1/FP-2 can include fewer or more than two outlet ports to convey the cooling airflow F.

Referring to FIG. 8, fluid port 66B of the scupper passage FP-4 is fluidly coupled to the mixing cavity MC. The fluid port 66B of the scupper passage FP-4 can be defined at the bottom dead center position of the bearing housing 66.

The scupper passage FP-4 can be fluidly coupled to a drain path DP (shown in dashed lines) that terminates at a lubricant collection area LCA (shown in dashed lines). The lubricant collection area LCA can be fluidly isolated from the lubricant source LS (FIG. 7) such that lubricant L collected in the lubricant collection area LCA does not return to the lubricant source LS. The leaked lubricant L can be diverted away from the core flow path of the engine and bleed systems of the aircraft, which can reduce emissions and odor in the aircraft cabin.

During operation, the mixed airflow F in the mixing cavity MC vents or is otherwise communicated downstream to the scupper passage FP-4. A relatively small amount of lubricant L may leak past the lubricant seal assembly 68 from the bearing compartment BC to the mixing cavity MC. The pressurized airflow F in the mixing cavity MC, centrifugal forces or slinging due to rotation of adjacent components, and/or gravity due to the orientation of the fluid port 66B of the scupper passage FP-4 causes the leaked lubricant L to drain or otherwise be communicated to the scupper passage FP-4 in response to the lubricant L being communicated from the bearing compartment BC to the mixing cavity MC. Once the leaked lubricant L and mixed airflow F are vented from the mixing cavity MC, the leaked lubricant L in the scupper passage FP-4 is communicated to the drain path DP and away from the vent cavity VC and airflow compartment AC. Leaked lubricant L conveyed from the drain path DP to the lubricant collection area LCA can be trapped as waste and later collected during a maintenance operation, for example.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples. Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A bearing assembly for a gas turbine engine comprising:
   a bearing housing extending along an axis to define a bearing compartment;
   a lubricant seal assembly adjacent to the bearing housing to bound the bearing compartment;
   an air seal assembly defining a vent cavity along the bearing housing, wherein a mixing cavity is defined between the lubricant seal assembly and the air seal assembly; and wherein the bearing housing defines an airflow supply passage, an airflow vent passage and a scupper passage having respective fluid ports at different circumferential positions relative to the axis, the fluid port of the airflow vent passage fluidly coupled to the vent cavity, and the fluid ports of the airflow supply and scupper passages fluidly coupled to the mixing cavity.

2. The bearing assembly as recited in claim 1, wherein the airflow supply passage is fluidly coupled to an airflow source that supplies airflow at a relatively lower temperature than airflow in the vent cavity.

3. The bearing assembly as recited in claim 2, wherein the airflow supply passage includes an inlet port fluidly coupled to the airflow source, the fluid port of the airflow supply passage includes first and second outlet ports at different circumferential positions relative to the axis, and the airflow supply passage branches from the inlet port to the first and second outlet ports.

4. The bearing assembly as recited in claim 1, wherein the airflow supply passage includes a first airflow supply passage and a second airflow supply passage, the respective fluid ports of the first and second airflow supply passages on opposed sides of the bearing housing with respect to a reference plane, the reference plane extending between the fluid port of the airflow vent passage and the fluid port of the scupper passage to define the opposed sides.

5. The bearing assembly as recited in claim 1, wherein the fluid port of the scupper passage is defined at a bottom dead center position.

6. The bearing assembly as recited in claim 5, wherein the fluid port of the airflow vent passage is defined at a top dead center position.

7. The bearing assembly as recited in claim 1, wherein the scupper passage is fluidly coupled to a drain path that terminates at a lubricant collection area.

8. The bearing assembly as recited in claim 1, wherein the air seal assembly includes first and second seals, the vent cavity extends between the first and second seals, and the first seal bounds the mixing cavity.

9. The bearing assembly as recited in claim 8, wherein the first and second seals are knife edge seals that establish a sealing relationship with seal lands defined along an inner diameter of the bearing housing.

10. A gas turbine engine comprising:
a fan section including a plurality of fan blades;
a compressor section;
a turbine section driving the fan section or the compressor section through a rotatable shaft that extends along an engine longitudinal axis; and
a bearing assembly comprising:
a bearing housing extending along the engine longitudinal axis to define a bearing compartment;
a bearing in the bearing compartment that supports the shaft;
a lubricant seal assembly adjacent to the bearing housing to bound the bearing compartment along the shaft;
an air seal assembly defining a vent cavity along the bearing housing, wherein a mixing cavity is defined between the lubricant seal assembly and the air seal assembly; and
wherein the bearing housing defines an airflow supply passage, an airflow vent passage and a scupper passage having respective fluid ports at different circumferential positions relative to the engine longitudinal axis, the fluid port of the airflow vent passage is fluidly coupled to the vent cavity, and the fluid ports of the airflow supply and the scupper passages are fluidly coupled to the mixing cavity.

11. The gas turbine engine as recited in claim 10, wherein the air seal assembly bounds a plenum axially aft of the mixing cavity with respect to the engine longitudinal axis, and a wall of the bearing housing defines the plenum.

12. The gas turbine engine as recited in claim 11, wherein the plenum is defined by a compressor rotor of the compressor section.

13. The gas turbine engine as recited in claim 11, wherein the airflow supply passage is fluidly coupled to an airflow source that supplies airflow at a relatively lower temperature than airflow in the plenum.

14. The gas turbine engine as recited in claim 10, wherein:
the airflow supply passage includes a first airflow supply passage and a second airflow supply passage spaced apart by the vent and scupper passages;
the fluid ports are defined along an inner diameter of the bearing housing;
the fluid port of the scupper passage is defined at a bottom dead center position; and
the fluid port of the vent passage is defined at a top dead center position.

15. The gas turbine engine as recited in claim 14, further comprising a seal runner mechanically attached to the rotatable shaft, wherein the seal runner establishes a sealing relationship with the lubricant seal assembly, and the air seal assembly includes first and second knife edge seals that extend outwardly from the seal runner to establish a sealing relationship with the inner diameter of the bearing housing.

* * * * *